United States Patent [19]

Newman

[11] 4,154,452

[45] May 15, 1979

[54] BICYCLE SAFETY ACCESSORY

[75] Inventor: Dekker K. Newman, Jenks, Okla.

[73] Assignee: Wizzard Enterprises, Inc., Tulsa, Okla.

[21] Appl. No.: 818,587

[22] Filed: Jul. 25, 1977

[51] Int. Cl.² .......................... B62H 1/12; B62J 27/00
[52] U.S. Cl. ................................ 280/293; 280/1.189; 280/239; 280/304
[58] Field of Search .............................. 280/293–304, 280/289 G, 1.189, 43, 239

[56] References Cited

U.S. PATENT DOCUMENTS

| 459,569 | 9/1891 | Wilson | 280/296 |
|---|---|---|---|
| 2,541,952 | 2/1951 | Williams | 280/303 |
| 2,918,300 | 12/1959 | Hendrickson | 280/43 |
| 3,023,027 | 2/1962 | Franciscus | 280/289 G |
| 3,284,096 | 11/1966 | Hansen et al. | 280/239 X |
| 3,653,679 | 4/1972 | Howard | 280/239 X |
| 3,888,511 | 6/1975 | Parilla | 280/239 |
| 3,961,810 | 6/1976 | Arico | 280/239 |
| 3,997,185 | 12/1977 | Parilla | 280/239 |
| 4,012,054 | 3/1977 | Moore | 280/239 |

FOREIGN PATENT DOCUMENTS 401320  1/1943  Italy ........................................ 280/295

Primary Examiner—Joseph F. Peters, Jr.
Assistant Examiner—Edmond G. Rishell, Jr.
Attorney, Agent, or Firm—James H. Chafin

[57] ABSTRACT

A bicycle safety accessory for preventing tipping over when the rider is executing a "wheelie" maneuver, the safety accessory utilizing a third wheel which is positioned directly behind the rear wheel of the bicycle and normally out of contact with the ground. The auxiliary wheel is carried by rearwardly extending support arms which are attached to the rear wheel and framework of the bicycle by special purpose bracketry such that the auxiliary wheel is substantially vertically adjustable.

7 Claims, 6 Drawing Figures

BICYCLE SAFETY ACCESSORY

BACKGROUND OF THE INVENTION

1. Field of the Invention

The present invention relates to bicycle safety accessories and, more particularly, but not by way of limitation, to a third wheel which extends rearwardly of the bicycle and is normally elevated off the ground level and contacts the ground only if the rider, while doing a rear wheel maneuver, tilts the bicycle too far.

2. History of the Prior Art

With the current popularity among children of the bicycle having a so-called banana seat, has come the safety problems associated with "popping wheelies" for which the banana seat bicycle is particularly adept.

Several attempts have been made to provide a rearwardly extending wheel to prevent tipping such as taught in the patents to Hansen et al, U.S. Pat. No. 3,284,096, issued Nov. 8, 1966 and Parrilla, U.S. Pat. No. 3,888,511 issued June 10, 1975. The patent to Hansen, while providing vertical adjustment of the rear wheel, requires a separate bracket attached to the seat of the bicycle which in turn requires modification of the existing structure.

The patent to Parrilla on the other hand, provides a simple attachment, but is not adjustable vertically. In fact the only effective adjustment is to move the parallel arms which support the extra wheel, either forwardly or rearwardly. Since these parallel arms are located at an angle, this would effect some minor vertical adjustment but not of any significance. Further, there is no showing of means in the Parrilla patent which would prevent the auxiliary wheel of Parrilla from dragging the ground when the bicycle is in a horizontal position.

SUMMARY OF THE PRESENT INVENTION

The present invention provides an effective bicycle safety wheel which is designed and constructed to overcome the disadvantages associated with the above identified prior art. The auxiliary stabilizer wheel of the present invention is carried by a pair of rearwardly extending support arms which are pivotally attached to the bicycle rear wheel and frame by bracket members. In one of the embodiments, a bracket attaches to the wheel axle and extends forwardly therefrom where it attaches to the rear horizontal frame member of the bicycle. The forward end of each support arm adjustably attaches to the bracket at various desired angles to effect vertical adjustment of the auxiliary wheel.

In the second embodiment, the forward end of the support arm is pivotally attached to the bicycle horizontal frame member forward of the rear wheel axle. Spaced rearwardly from this pivotal attachment point is a second vertically disposed supporting plate which has a plurality of vertically spaced mounting holes for receiving the rear wheel axle end therethrough. Therefore, by simply changing the vertical bore in the supporting plate, again the auxiliary rear wheel can be vertically adjusted.

In each of the embodiments the support arms are attached to the rear wheel and frame member without any modification needed to the existing bicycle axle or frame. There are no attachment supports which must be connected to the bicycle seat or to any other part of the bicycle. When the support arms are in a particular desired position, they are rigidly attached so that the auxiliary wheel is positively held in a certain position with respect to the bicycle at all times whether a maneuver is being performed or not.

DESCRIPTION OF THE DRAWINGS

Other and further advantageous features of the present invention will hereinafter more fully appear in connection with a detailed description of the drawings in which.

DESCRIPTION OF THE PREFERRED EMBODIMENTS

Figure 1:
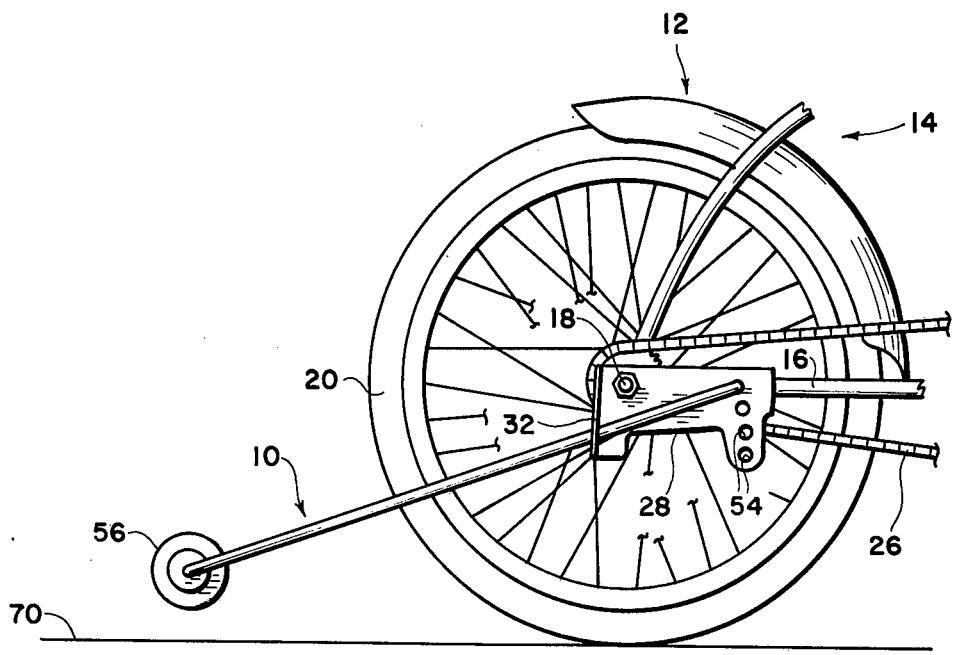
FIG. 1 is a side elevational view of the rear portion of the bicycle having an auxiliary rear safety wheel embodying the present invention.

Referring to the drawings in detail, reference character 10 generally indicates an auxiliary safety wheel assembly for use with, and carried by a bicycle, the rear portion thereof generally indicated by reference character 12. The pertinent portions of the rear part of the bicycle 12 comprise a frame member generally indicated by reference character 14 and having a horizontal member 16. The frame portion 14 terminates near the rear end of the bicycle at a rear wheel axle 18 which rotatingly carries a rear wheel 20, a wheel brake drum 22 and in most cases a drive chain sprocket 24 which is operably connected to a front sprocket by means of a typical bicycle chain 26.

Figure 2:
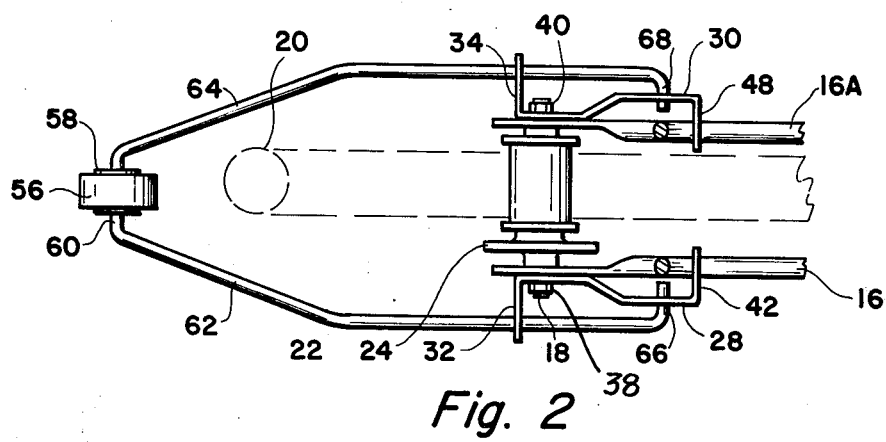
FIG. 2 is a top plan view, partially in section, of the device of FIG. 1.
Figure 3:
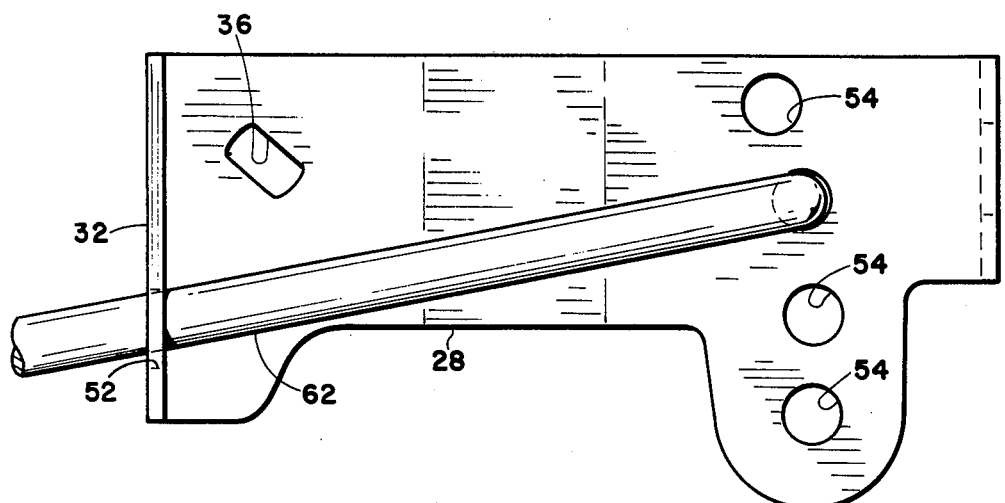
FIG. 3 is a detailed side elevational view of the bracket of the device in FIG. 1.

The auxiliary wheel assembly 10 generally comprises a pair of oppositely disposed bracket plates 28 and 30, each having outwardly extending vertically disposed flange plates 32 and 34 along the rear edge thereof. The upper rear portion of each support plate 28 and 30 are provided with suitable bores or adjustable slots 36 typical of the support plate 28 shown in detail in FIG. 3. The bore or slot 36 is adapted to receive the end of the bicycle rear wheel axle therethrough and which may be firmly locked in place by a suitable axle nut 38. Likewise the opposite bracket member 30 is locked into place by a similar nut 40. The forward end of each bracket plate 28 and 30 is provided with an inwardly extending flange plate 42 and 48, respectively each of which are connectable by means of a suitable open aperture or groove 50, typical of the plate 28, and shown in FIG. 4, for receiving the bicycle horizontal frame member 16 therein. The right hand horizontal frame member is designated as 16 while the left horizontal frame member, as shown in FIG. 2, is designated 16A.

Figure 4:
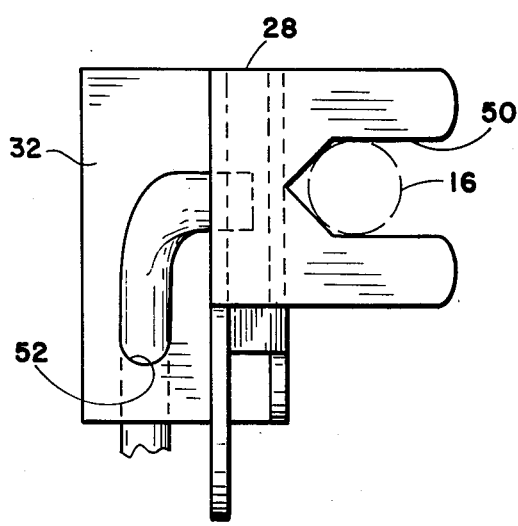
FIG. 4 is a front end view of the bracket in FIG. 3.
Figure 5:
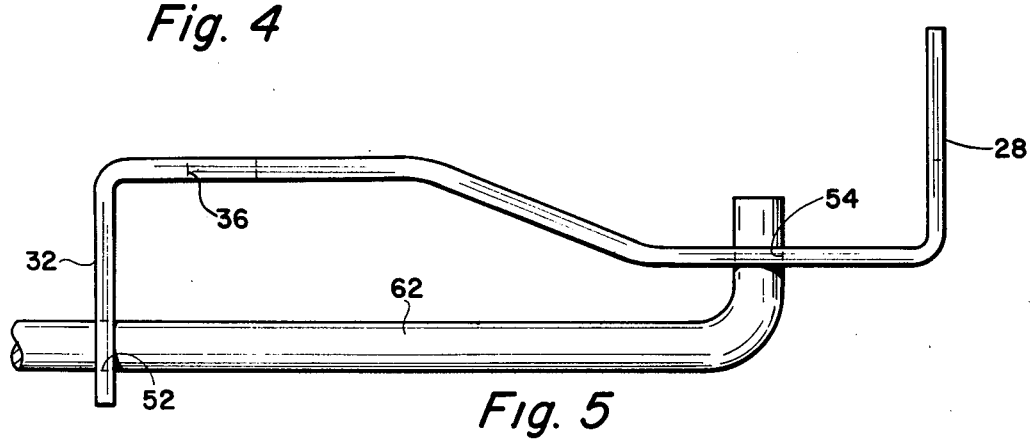
FIG. 5 is a top plan view of the bracket of FIG. 3.

The outwardly extending flange plates at the rear of the brackets 28 and 30 are provided with a hole therethrough which is designated by reference character 52 typically shown on the support plate or bracket plate 28 of FIG. 4. The forward portion of the bracket plate 28 is then provided with a plurality of spaced transverse bores 54 therethrough for a purpose that will be hereinafter set forth.

The wheel assembly generally indicated by reference character 10 also comprises an auxiliary wheel member 56 which may be rotatably carried by a bearing plate 58 which is in turn attached to a transverse axle member 60. The axle member 60 is supported at each end between a pair of oppositely disposed elongated support arms 62 and 64. It can be seen that the support arms 62 and 64 and the transverse axle member 60 may be constructed of a single piece of stock iron rod whereby the wheel member 56 is secured in place on the rod before the bending operation to shape the rod as shown in FIG. 2. The forward ends of the arms 62 and 64 are passed through the aperture 52 of each of the bracket plates 28 and 30 and terminate by inwardly extending rod members 66 and 68, respectively, which are engageable with the bores 54 of the respective bracket plates.

To adjust the angle of the support arms and hence the vertical position of the auxiliary wheel 56, the forward end of the support arms 62 and 64 containing the inwardly extending rod segments 66 and 68 are simply moved to the desirable hole 54 in the forward portion of the bracket plate. In practice, due to the tolerance of the bracket plates, in order to change the angle of the support arms, it is necessary to remove the bracket plates from the bicycle rear wheel or at least loosen them to the extent that there will be enough play to allow changing adjustment holes.

Therefore, in operation when the bicycle rider attempts a rear wheel maneuver and goes over too far the auxiliary wheel contacts the ground plane which is generally indicated by reference character 70 and prevents tipping over backwards. Although the particular design for the auxiliary wheel assembly 10 is for use with a bicycle, it can by the same principal be adapted for use with a motorcycle where such rear wheel maneuvers are even more risky to both the rider and to potential damage to the vehicle. It is further noted that the wheel member could be replaced by a skid plate but would not be as effective.

Figure 6:
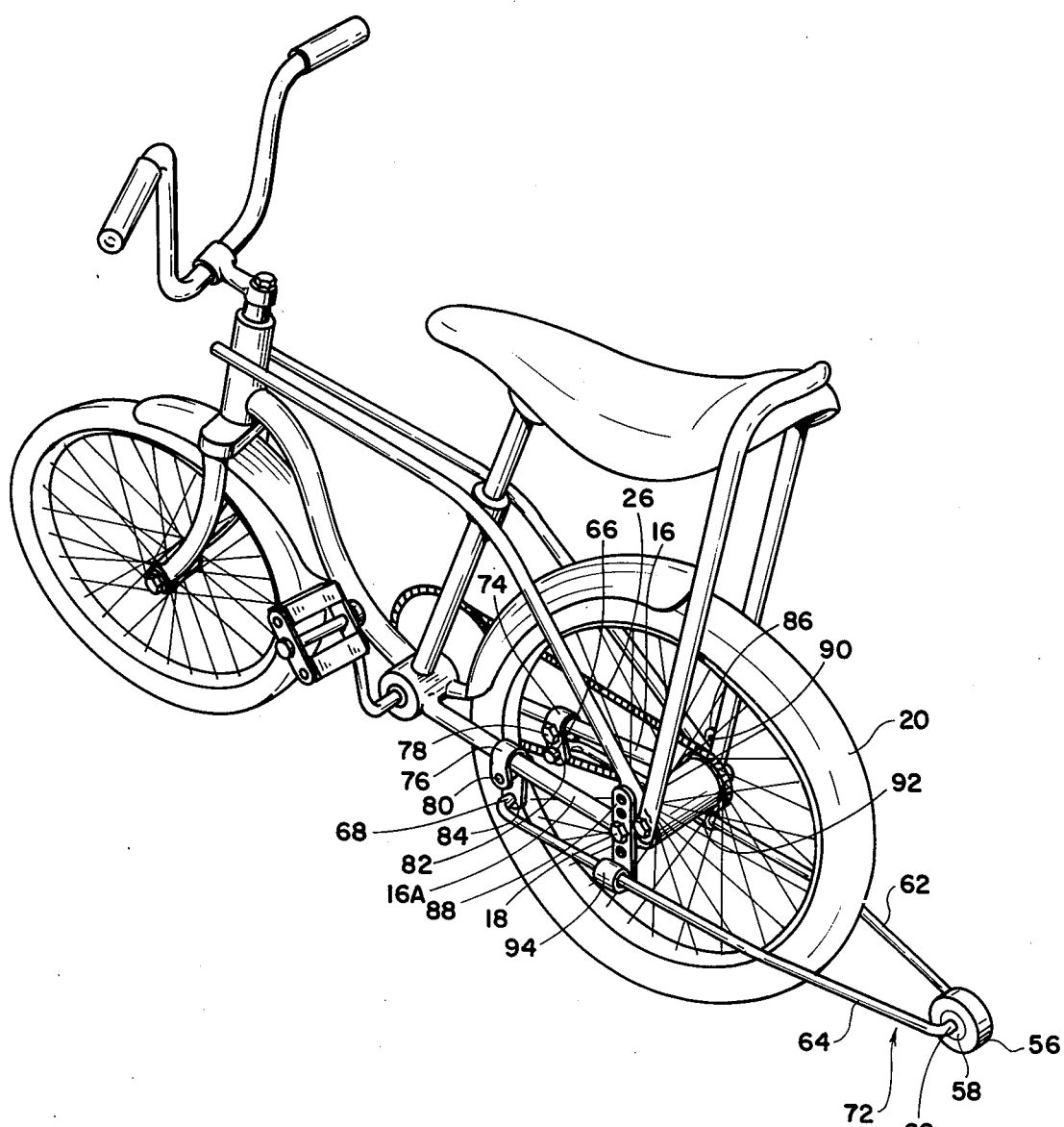
FIG. 6 is a prospective view of a bicycle having an auxiliary safety wheel representing a second embodiment of the invention.

Referring now to FIG. 6, reference character 72 generally indicates a second embodiment of an auxiliary wheel assembly which works on substantially the similar principle as the embodiment described in relation to FIGS. 1 through 5 of the drawings.

The rear wheel and forwardly extending support arms may be substantially identical to that of the embodiment 10 and therefore carry the same reference character numbers to avoid duplicity of description. The mounting bracketry for the wheel assembly 72 however is described as follows: The assembly comprises a pair of oppositely disposed forward bracket members 74 and 76 each of which may be secured by means of a simple bolt and nut indicated by reference character 78 and 80 respectively to the horizontal frame member 16 and 16A forward of the rear wheel axle member 18. The brackets or straps 74 and 76 are provided with a downwardly extending portion having a transverse bore therein for receiving the inwardly directed rod segments 66 and 68. The bores are generally indicated by reference characters 82 and 84.

It is seen that the forward ends of the support arms 62 and 64 are pivotally connected to the bracket members or straps 74 and 76. The bracket means further comprises a pair of oppositely disposed elongated plate members 86 and 88 which are provided with a plurality of vertically spaced bores 90 and 92 therein for receiving the bicycle rear wheel axle ends 18 therethrough. The lower ends of the plates 86 and 88 are provided with longitudinal sleeve members 94 which are reciprocally carried by the support arms 62 and 64. Therefore, it is readily seen that since the support arms 62 and 64 are pivotally carried at their front ends by the bracket member 74 and 76 the angle of their orientation with respect to the bicycle is governed by which of the bores 90 and 92 are threaded on the bicycle rear wheel axle 18.

Again, the embodiment described by reference character 72 could be readily adaptable for use with the motorcycle as well as the bicycle. It is further seen in the embodiment 72 that the space between the attachment plates 86 and 88 and the forward end brackets 74 and 76 are adjustable simply by moving the said end brackets forward and securing them in place on the bicycle horizontal frame member 16 and 16A. It is further noted that on the embodiment described by reference character 10, this spacing cannot be adjusted but fixed according to the manufacture of the plate. Naturally, if it is determined that more support is needed by way of a lever arm, the bracket members 28 and 30 of the first embodiment may be constructed with more spacing between the wheel axle aperture 36 and the spaced bores 54.

Whereas, the present invention has been described in particular relation to the drawings attached hereto, other and further modifications apart from those shown or suggested herein may be made within the spirit and scope of the invention.

What is claimed:

1. An auxiliary safety device for bicycles having a rear wheel axle and forwardly extending horizontal frame members forming a rear wheel support frame on each side of said rear wheel, the device comprising;
    (a) a spaced pair of generally parallel support arms extending rearwardly from each side of the bicycle rear wheel;
    (b) a ground contact member secured to the rear end of the support arms;
    (c) attachment bracketry secured to the bicycle rear wheel axle and forwardly extending horizontal frame members, said attachment bracketry comprising a pair of plates having apertures at the rear portion thereof for receiving said support arms therethrough and a plurality of spaced apertures at the front portion thereof for receiving the front ends of said support arms therein for providing angular adjustment of said support arms.

2. An auxiliary safety device for bicycles as set forth in claim 1 wherein the support arms are joined by a transverse member at the rear ends thereof to form a U-shaped member, the ground contact member being carried by the transverse member.

3. An auxiliary safety device for bicycles as set forth in claim 2 wherein the ground contact member is a wheel rotatably secured to said transverse member.

4. An auxiliary safety device for bicycles as set forth in claim 1 wherein the attachment bracketry comprises oppositely disposed bracket means on each side of the bicycle rear wheel for supporting the forward ends of the support arms, each bracket means comprising a fulcrum support for pivotally carrying a support arm.

5. An auxiliary safety device for bicycles having a rear wheel axle and forwardly extending horizontal frame members forming a rear wheel support frame on each side of said rear wheel, the device comprising:
    a spaced pair of generally parallel support arms extending rearwardly from each side of the bicycle rear wheel;
    a ground contact member secured to the rear end of the support arms; and attachment bracketry secured to the bicycle rear wheel support frame, said bracketry comprising oppositely disposed bracket means on each side of the bicycle rear wheel for supporting the forward ends of the support arms, each bracket means comprising a fulcrum support for pivotally carrying a support arm and a plurality of substantially vertically spaced attachment means spaced from said fulcrum support and being capable of carrying the forward end portion of the support arms at various angles, and wherein said bracket means comprises a bracket plate having a transverse bore at a rear end portion thereof for attachment to the bicycle rear wheel axle and a substantially U-shaped groove spaced from said bore for receiving bicycle horizontal frame member therein.

6. An auxiliary safety device for bicycles as set forth in claim 5 wherein said fulcrum support comprises an outwardly extending flange plate carried by the rear portion of the bracket plate and having a longitudinal bore therethrough for receiving the forward end portion of the support arm therein.

7. An auxiliary safety device for bicycles as set forth in claim 5 wherein said plurality of vertically spaced attachment means comprises a plurality of transverse bores and the forward end of each support arm is provided with inwardly extending rod segments insertable in each of the transverse bores.

* * * * *